Patented Aug. 15, 1944

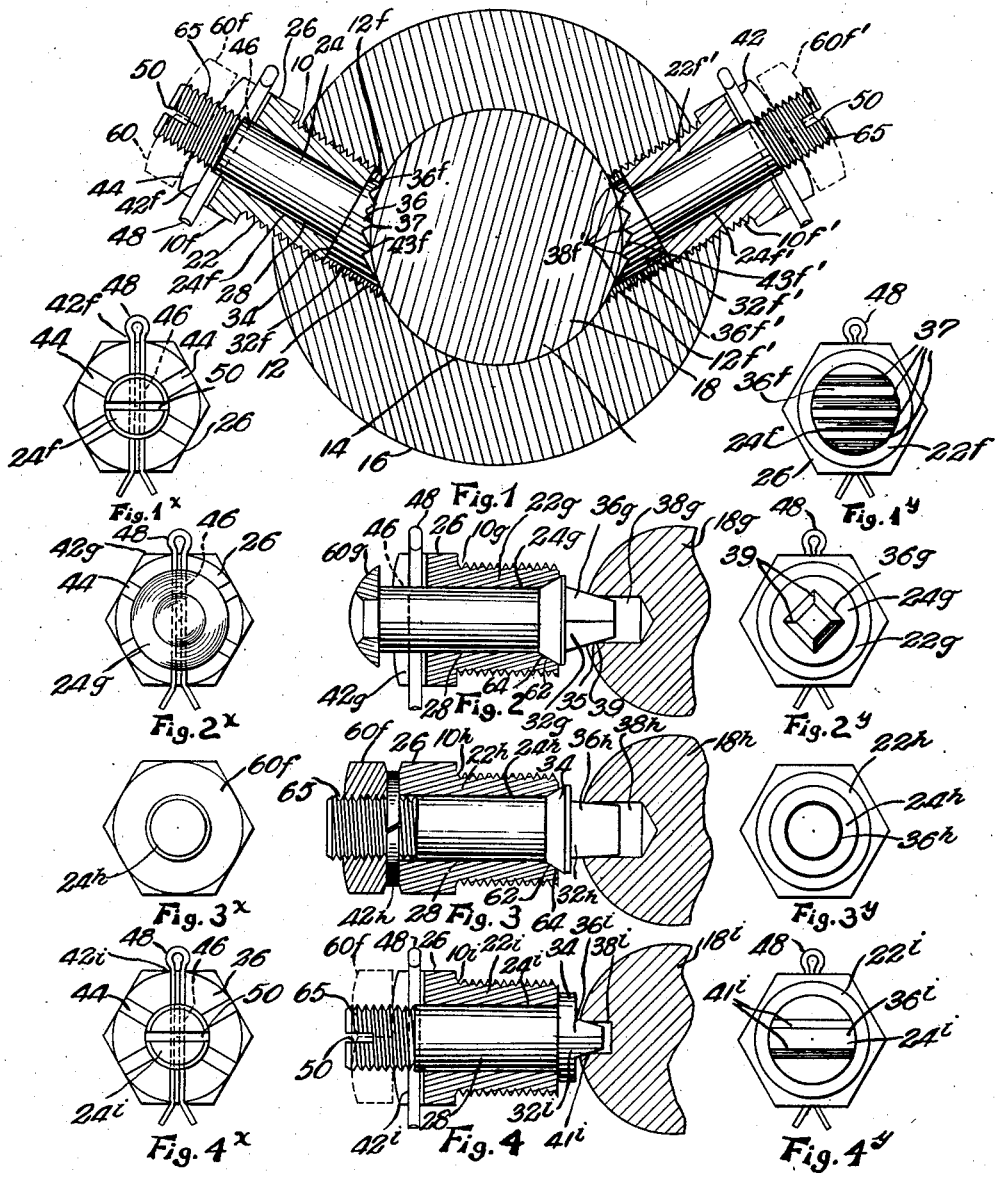

2,355,900

UNITED STATES PATENT OFFICE 2,355,900

LOCKING WEDGE POINT SETSCREW

Herbert G. Beede, Pawtucket, R. I., assignor to Pantex Pressing Machine, Inc., Central Falls, R. I., a corporation of Delaware Application December 6, 1940, Serial No. 368,884

4 Claims. (Cl. 151—32)

My invention relates to improvements in wedge point set screws particularly of the general type of locking set screw described in my copending application S. N. 368,414 for Locking set screw, filed December 4, 1940, and illustrating additional embodiments of the novel features claimed therein. The present application is specifically directed to supplemental features which may be employed in such a locking set screw, particularly one having a wedge point to engage with a complemental deformation or cavity in the movable member.

An object of the present invention is to so design such a wedge point locking set screw that the parts thereof may be relatively adjusted to reduce play in the locking action of the set screw on the retaining and movable members.

A further object of my invention is to provide a novel type of set screw which may be self-jacking for the more ready and facile removal of the wedge point from the movable member and simultaneous release of said play-preventing means.

Further features of my invention relate to various modifications of the structural features of the improved set screw shown in this and said parent application S. N. 368,414 to eliminate play or backlash and/or to permit said self-jacking.

These and such other objects of my invention as may hereinafter appear will be best understood from a description of the accompanying drawing which illustrates various embodiments of my invention.

In the drawing, Fig. 1 is a transverse sectional view through a shaft and a retaining collar with the collar having two set screws constructed in accordance with one modification of my invention mounted therein in opposing oblique directions, showing the bolt portions of each set screw also in axial section and the stem portions and my improved type of locking means in elevation and illustrating my improved type of jacking means and a specific form of locking projection.

Fig. 1x is a plan view of the first modification of locking set screw.

Fig. 1y is a reverse plan view of the first modification of locking set screw.

Fig. 2 is a sectional view of a second modification of a locking set screw with the retaining member omitted, showing the bolt portion of the set screw in axial section and the stem member and locking means in elevation.

Fig. 2x is a plan view of the second modification of locking set screw.

Fig. 2y is a reverse plan view of the second modification of locking set screw.

Fig. 3 is a sectional view similar to Fig. 2 of a third modification of my invention with the retaining member omitted, having a different modification of means adapted to wedgedly engage a preformed deformation in the movable member, showing the bolt portion of the set screw in axial section and the stem member and locking means in elevation and illustrating my improved type of play prevention means of Fig. 2, another type of locking means and the jacking means of Fig. 1.

Fig. 3x is a plan view of the modification of locking set screw shown in Fig. 3.

Fig. 3y is a reverse plan view of the modification of locking set screw shown in Fig. 3.

Fig. 4 is a sectional view similar to Fig. 2 of a fourth modification of my invention with the movable member omitted, showing the bolt portion of the set screw in axial section and the stem member and locking means in elevation and illustrating an engaging means formed of a diametric projection to positively engage a spline in the shaft, and employing my preferred species of locking means and jacking means.

Fig. 4x is a plan view of the fourth modification of locking set screw.

Fig. 4y is a reverse plan view of the modification of locking set screw shown in Fig. 4.

In the drawing, wherein like characters of reference generally indicate like parts throughout, 10 generally indicates a locking set screw similar to those shown in said application while my improved type of set screw 10 may be employed for locking any type of a relatively movable second member 18 in adjusted position relative to a retaining or first member 16, I have illustrated it in the drawing as employed to lock a movable shaft or second member 18 in a bore 14 in a housing or first member 16 with the set screw having a threaded shank 22 suitably inserted within a threaded set screw hole 12 in said housing or first member 16. In all embodiments of my invention shown, the shank 22 comprises the usual bolt member 22 of a set screw, is provided with a hollow preferably smooth circular axial bore 28 and with a standard type of turning head 26 or other suitable turning means. The inner locking stem member 24 extends through said hollow bolt shank member bore 28 and has an end portion 32 with an upper portion 34 of greater area than said bolt member bore 28 below said bore to positively limit the axial outward movement of said stem member 24 relative to said bolt member 22, and with means 36 on the lower end thereof for non-rotatably engaging said movable member 18 in said retaining member recess 14 to restrain relative movement between said relatively movable second and retaining first members. I also employ means 42 for locking said bolt member 22 to said inner stem member 24 with said means 36 on the end portion 32 of said stem member thereof non-rotatably engaging said second movable member 18 in the desired adjusted manner.

Any suitable means 36 on the lower end of said end portion 34 for non-rotatably engaging said movable second member to restrain relative movement between said movable second and retaining first members may be employed, and I have shown in the drawing two generic types of such means, although the features of my present invention may be employed with any of the three generic species described in said other application, namely, (1) means on said end portion to positively mate with preformed means on said movable member, as in the modifications shown in Figs. 2, 3 and 4; and (2) a pointed projection on said end portion adapted to positively bite into said movable second member to form its complementally shaped interlocking portion thereon while being inserted, as in the modification shown in Fig. 1. This feature (2) is also partially shown in the modifications shown in Figs. 2, 3 and 4, wherein the projection is of a different shape from its cooperating cavity to deform its complementally shaped interlocking portion thereon while being inserted to also provide a wedging locking action in the modifications shown in Figs. 2, 3 and 4, as well as in the modification shown in Fig. 1.

In the modification 10$^f$ of my invention shown in Fig. 1 illustrating the principle (2), I have shaped said portion 36$^f$ of said locking portion 32$^f$ of a transverse concave shape of a curvature generally similar to the shaft or second member 18 and have provided it with a plurality of transversely arranged parallel teeth 37 to positively bite into said shaft to form this complementally shape deformed interlocking portion 38$^f$ therein to provide a wedge portion for wedgedly engaging the shaft 18.

In the modification of my invention shown in Fig. 2 I have provided the portion 36$^g$ shown therein as of truncated pyramidal shape to fit into a cylindrical radial hole 36$^g$ in said shaft, the edges 39 of said pyramid biting into the edge of the side wall of said cylinder to wedgedly engage said point 36$^g$ in the cooperating recesses 35 formed in said edge. In the modification of my invention shown in Fig. 3, the portion 36$^h$ shown therein comprises a frustroconical lower end 36$^h$ adapted to contact the edge of the side wall of a cylindrical radial hole 38$^h$ in said shaft 18 to positively prevent relative movement between said movable member 18 and retaining member 16.

In the modification of my invention shown in Fig. 4 I have shown a toothed point 36$^i$ adapted to fit in a complemental transverse slot 38$^i$. In this modification, the side walls 41$^i$ of the tooth point 36$^i$ taper inwardly so that lines along the walls thereof may engage with the outer edges of the side walls of said axial slot 38$^i$ to supplementally provide a wedging action as in the other embodiments shown. It is apparent, however, that any suitable type of engaging means may be employed.

Any suitable type of means 42 for locking the rotatable bolt member 22 to said stem member 24 with the engaging means 36 non-rotatably engaging said movable second member in the desired adjusted manner may be employed. In the modification shown in Figs. 1, 2 and 4 I have illustrated the preferred type of locking means consisting of a plurality of diametric slits 44 in the upper surface of the turning head 26 of the bolt member 22 and I preferably provide a diametric hole 46 adjacent the outer end of said stem member. After the shaped engaging means 36 of the end portion 32 of the stem member has engaged the shaft 18, a cotter pin 48 may be inserted through the most adjacent diametric slit 44 in the turning head 26 and the diametric hole 46 in said stem member for this purpose aligned therewith. For the purpose of relatively turning the stem member 24 to said bolt member 22, the outer end of the stem member may be provided with suitable means for turning it, such as the diametric slot 50 to receive the end of a screw driver therein. If desired, however, a separate external head of any standard type known in the art may be employed. In place of the preferred type of locking means 42 any suitable type of locking means may be employed, such as the lock washer 42$^h$ of standard construction shown in Fig. 3, which may be inserted axially between the head 26 of the bolt member 22 and the jack nut 60$^f$ shown therein and later to be described, although, a lock washer 42$^h$ may be employed between other portions of said bolt and stem members.

To eliminate play between the set screw and the movable member to be restrained, in the embodiment shown in Fig. 1, the set screw hole 12$^f$ is oblique to the shaft or second member 18 contained in the recess 14 in the retaining or first member 16, and the point 36$^f$ is provided with an end surface 43$^f$ shaped to evenly contact and preferably embrace the movable member at such an oblique angle. With this construction it will be obvious that the thrust of the set screw will not be purely radial and that a component of such thrust will tend to wedgedly force the side wall of the stem member 24 of the set screw against adjacent portions of the inner periphery of the hollow bolt member 22, causing the stem member and the bolt member to contact along such portions to substantially eliminate play and backlash between said set screw and movable member. If desired, as shown in Fig. 1, the shaped surface 43$^f$ may be provided with a plurality of teeth 37 therein, preferably as shown, parallel to the axis of the shaft 18 to positively bite into said shaft or movable second member to positively prevent turning movement of said movable member in at least one direction. A similar set screw hole 12$^{f'}$ may be provided in the retaining member 16 oblique relative to the shaft 18 in the opposite direction, and a similar set screw 10$^{f'}$ may be inserted in said hole 12$^{f'}$ with the shaped surface 43$^{f'}$ thereof arranged to abut and embrace the shaft 26 in the opposite manner to that in which the surface 43$^f$ of the set screw 10$^f$ engages said shaft. It is apparent that to prevent rotation of the shaft in one or both directions and to prevent play it is merely necessary to modify the engaging means 36$^f$ of the set screw for this purpose and arrange the set screw hole 12$^f$ in the retaining member 16 at an oblique angle to the movable member 18, whether two of such set screws 10$^f$ and 10$^{f'}$ and such set screw holes 12$^f$ and 12$^{f'}$ or a single such set screw 10$^f$ and its cooperating set screw hole 12ᶠ be employed. It is thus obvious that at least a portion of this method of eliminating play is in the inherent structure of the movable member engaging means on the end of the set screw itself.

If desired, another method of eliminating play between the set screw and the movable member may be provided in the structure of the set screw itself. For this purpose the bore 28 of the outer hollow bolt member 22 may be provided with a conical portion 62, preferably inwardly tapered, preferably near the lower end thereof as shown in Figs. 2 and 3, and the upper portion 34 of said end portion 32 of greater area than said bolt member bore 28 may be provided with a complementally shaped tapered upper surface 64 to wedgedly engage the surface 62 of said bore 28 to prevent play. It is obvious that with this construction the cooperating tapered surfaces 62 and 64 will engage against each other to prevent play between the bolt member 22 and the stem member 24, thereby, as in the modification shown in Fig. 1, preventing play between such members. If, however, the wedge points 36ᶠ, 36ᵍ, 36ʰ and 36ⁱ be also employed to positively engage a shaped cavity, whether preformed or formed by the insertion of the stem member 24, play will also be substantially eliminated between said stem member 24 and movable second member 18. It is apparent, therefore, that if both types of means to prevent play, namely (1) between the bolt member and the stem member and (2) between the point of the stem member and the movable member be employed, play and backlash will be substantially eliminated, as in the modifications shown in Figs. 1–3.

As stated hitherto, I may employ in association with the novel features of my preferred set screw heretofore described, means effective on withdrawal of said set screw to positively pull said movable means 24 away from engagement with said movable member 18 to release said play preventing means, it being obvious that in the modification shown in Fig. 1 that as soon as the teeth 37ᶠ are raised from their cooperating cavities 38ᶠ there will be no binding between the outer wall of the stem member 24 against the inner periphery of the bolt member 22 at any portion thereof, and that in the modifications shown in Figs. 2 and 3, as soon as the bolt member 22 is moved axially relative to the stem member, the cooperating play preventing conical surfaces 62 and 64 will be released from binding contact. Such means preferably comprises means 60 associated with the upper end of the stem member of greater area than the bore 28 of the bolt member 22 to positively pull the pointed end 36 out of engagement with the movable member 18 on unscrewing the threaded bolt member 22 of said set screw. As in the modification of my invention shown in Fig. 2, said means 60ᵍ shown therein may comprise a flattened head 60ᵍ for the stem member of greater area than said bolt member bore 28. If desired, however, said means may include a threaded portion 65 on the outer periphery of the stem member 22 and a cooperating jack nut 60ʲ adjustably threaded thereon. In the modifications shown in Figs. 1, 2 and 4, the jack nut 60ᶠ is first unscrewed to be released from a locking position. It then may be gripped in the same wrench as the head 26 of said bolt member 22 and partially unscrewed simultaneously therewith to provide a jacking space between the lower end of the hollow bolt member 22 and the point portion 32 of the stem member 24. Then by tightening the jack nut 60ᶠ it will function to draw said pointed end 36 out of engagement with the movable member 18 or its cooperating cavity, withdrawing said pointed end 32 in the jacking space just provided. The set screw may then be unscrewed by hand and withdrawn. It is obvious, however, that any suitable means other than those shown, effective on withdrawal of said set screw to positively pull said movable means 24 away from engagement with said movable member and to release said play preventing means, where used, may be employed.

It is obvious, however, that if the jack nut 60ᶠ be employed, it may, if desired, also function as a lock nut to become means for locking said rotatable inner stem member to said outer bolt member with the point portion thereof nonrotatably engaging said movable member in the desired adjusted manner, wedging contact between the jack nut threads and the threads 65 on the stem member functioning to lock the jack nut 60ᶠ to the stem member 24 and contact between the lower surface of the jack nut 60ᶠ and the upper surface of the turning head 26 of the bolt member serving to lock the lock nut to the bolt member and with this construction it is obvious that other types of locking means for locking the stem member to the bolt member shown in the drawing may be dispensed with.

To employ my set screw, it is merely necessary to screw the set screw 10 within the hole 12 until the engaging means 36 thereof firmly abuts the desired portion of the movable member 18 no matter what the cooperating shapes of said engaging means 36 and movable member may be. If desired, as shown in Fig. 1, a slot 50 may be provided in the outer end of the stem member to rotate the stem member 24 within the hollow bolt 22 to suitably align said engaging means 36 with its cooperating portion of said movable second member whether or not said portion includes the cavity 38 preshaped or formed by the act of insertion of the set screw. To prepare for locking, if necessary, the head 26 may be further turned until a selected channel 44 in said turning head 26 is brought into alignment with the diametric hole 46 on the stem. It is apparent that during this extra turning motion, if necessary, the relative conical surfaces 62 and 64 will more positively engage to prevent play while yielding to permit this extra turning movement. To lock, the locking pin 48 may then, in the modification shown in Figs. 1, 2 and 4, be inserted through said aligned channel 44 and diametric hole 46 to permanently lock the set screw in the desired adjusted position with the engaging means thereof engaging said movable member in the desired adjusted manner. The modification of my invention shown in Fig. 3 may be locked on suitable turning movement of the jack nut 60ᶠ, the lock washer 42ʰ becoming automatically locked as the jack nut is turned relative to said turning head 26. If the jack nut 60ᶠ be employed alone as a locking means, it is obvious that it will become automatically locked as soon as its lower surface contacts the upper surface of the turning head 26 with sufficient force to wedge its threads against the threads 65 of the stem member. It is apparent that turning the turning head automatically brings the conical surfaces 62 and 64 into intimate contact throughout the periphery thereof to prevent backlash substantially at the moment that the engaging means 36 engages the movable member 18, the friction between these two surfaces, however, being increased if an extra turning movement is given for the purpose of aligning or locking the locking means. In the modification shown in Fig. 1, due to the obliquity of the set screw holes 12$^f$ and 12$^{f'}$ relative to the radius of the shaft 18 shown therein, the portions of the outer periphery of the stem member will contact the portions of the inner periphery of the bolt member to prevent backlash as said engaging portion wedgedly engages its cooperating shaft portion, such contacting portions depending, as stated, on the angle of obliquity of the set screw holes 12$^f$ and 12$^{f'}$ relative to said radius. It will be noted that I have shown the jack nut 60$^f$ in dotted lines in Figs. 1 and 4, and it obviously is not necessary for the proper functioning of my improved set screw in use unless it be employed as part of the locking means, as shown in Fig. 3, to wedgedly bind against the lock washer 42$^h$. As stated, however, the jack nut 60$^f$ is an inherent part of the means to release the type of backlash permitting means shown in Figs. 1–3, not only in these embodiments which have the contacting surfaces 62 and 64 as shown in Figs. 2 and 3, but also where the point wedgedly engages the movable member at an oblique angle, as shown in Fig. 1.

To remove the set screw in the modification shown in Fig. 2, it is merely necessary to release the locking means by withdrawing the pin 48 and unscrewing the turning head 26 which will abut the enlarged jacking head 60$^g$ of the stem member which will function to pull the pointed end 36$^g$ of the stem member out of engagement with its cooperating cavity 38$^g$ in the movable member 18. In the modification of my invention shown in Figs. 1 and 4, the jack nut 60$^f$ may be inserted on said threaded end 65 of the stem member merely for the purpose of removing the set screw by providing means for positively pulling the set screw point 36 out of engagement with its cooperating cavity 38 on the shaft 18. For this purpose the jack nut 60$^f$ is only screwed on said threaded end until it is adjacent to but not touching the upper surface of the turning head 26 so that it will not function as a lock nut therefor. The pin 48 may then be removed and the same wrench employed to turn the turning head 26 and also turn the jack nut 60$^f$ to partially simultaneously unscrew the set screw and provide jacking means to positively pull the pointed end 36 of the stem member out of engagement with its cooperating cavity 38 in the shaft member 18 on a latter tightening of the jack nut 60$^f$ in the manner hitherto described, the cooperating threads 65 on the outer periphery of the stem member 24 and the threads on the inner periphery of the jack nut 60$^f$ cooperating as inclined planes to effect this pulling movement. If the jack nut 60$^f$ be also employed as a portion of the locking means, as shown in Fig. 3, it is obvious that it will have to be initially unscrewed on said threads 65 to be moved out of contact with the lock washer 42$^h$ to release said locking means prior to the actuation of said lock nut 60$^f$ by a suitable wrench or other means, said lock nut 60$^f$ then functioning as a jack nut to positively pull the pointed end 36 of the stem member out of engagement with its cooperating cavity 38 in the movable member in similar manner as in the other modifications. It is also obvious that the jack nut 60$^f$ will function in the manner explained to release the backlash preventing means, whether said means comprises the contacting surfaces of the stem member and bolt member of the modification shown in Fig. 1 in the manner hitherto described, or whether said means comprises the contacting conical surfaces 62 and 64 of the modifications shown in Figs. 2 and 3, as the jack functions to release the pointed end 36 from its cooperating cavity 38.

It is apparent, therefore, that I have provided certain novel modifications employing the general principles of the set screw shown in my companion application heretofore referred to, particularly adapted to positively engage the movable member with a wedging action and to provide means to prevent play and backlash between the parts thereof and the movable member and that I have also provided, preferably in association therewith, a suitable means effective on withdrawal of said set screw to positively pull said movable or pointed engaging means 36 away from engagement with said movable member and at the same time release said play preventing means with the advantages described above.

It is understood that my invention is not limited to the specific modifications shown or described and that various deviations may be made therefrom without departing from the spirit and scope of the appended claims.

What I claim is:

1. A set screw for insertion within a threaded set screw hole in a first member extending to a second member movable relative to said first member, comprising a threaded bolt member having a smooth circular bore and a turning head, a locking stem member extending through said bore having an end portion of greater area than said bore beyond the threaded end of said bolt member, said end portion having its largest effective diameter less than the continuous effective diameter of the set screw hole so that it may be freely rotated therein and having its end wedge-shaped for non-rotatable engagement with said second member and means for locking said bolt member to said stem member, said stem member having means associated with the upper end thereof of greater area than the bore of the bolt member to abut the turning head when the bolt member is partially unthreaded for release.

2. A set screw for insertion within a threaded set screw hole in a first member extending to a second member movable relative to said first member, comprising a threaded bolt member having a smooth circular bore and a turning head, a locking stem member extending through said bore having a head portion of greater area than said bore, and an end portion of greater area than said bore beyond the threaded end of said bolt member, said end portion having its largest effective diameter less than the continuous effective diameter of the set screw hole so that it may be freely rotated therein and having means on the said end portion for non-rotatable engagement with said second member and means for locking said bolt member to said stem member with said means on the end portion of said stem member engaging said second member in the desired position.

3. A set screw for insertion within a threaded set screw hole in a first member extending to a second member movable relative to said first member, comprising a threaded bolt member having a smooth circular bore and a turning head, a locking stem member extending through said bore having a threaded upper end and an end portion of greater area than said bore beyond the threaded end of said bolt member, said end portion having its largest effective diameter less than the continuous effectitve diameter of the set screw hole so that it may be freely rotated therein and having means on the said end portion for non-rotatable engagement with said second member and a lock nut adjustably rotatable on the threaded upper end of said stem member to positively pull said engaging means out of engagement with said second member on relative unscrewing of said set screw.

4. A set screw for insertion within a threaded set screw hole in a first member extending to a second member movable relative to said first member, comprising a threaded bolt member having a smooth circular bore and a turning head, a locking stem member extending through said bore having a threaded upper end, and an end portion of greater area than said bore beyond the threaded end of said bolt member, said end portion having its largest effective diameter less than the continuous effective diameter of the set screw hole so that it may be freely rotated therein and having means on the said end portion for non-rotatable engagement with said second member, means for locking said bolt member to said stem member with said means on the end portion of said stem member engaging said second member in the desired position, and a lock nut adjustably rotatable on the threaded upper end of said stem member to positively pull said engaging means out of engagement with said second member on relative unscrewing of said set screw.

HERBERT G. BEEDE.